United States Patent

[15] 3,648,586

Welzel

[45] Mar. 14, 1972

[54] FILM WINDING APPARATUS FOR CAMERAS

[72] Inventor: Herbert Welzel, Dresden, Germany

[73] Assignee: Kombinat VEB PENTACON DRESDEN Kamera- und Kinowerke, Dresden, Germany

[22] Filed: July 3, 1969

[21] Appl. No.: 838,933

[52] U.S. Cl. ............................................................95/31 R
[51] Int. Cl. ........................................G03b 1/24, G03b 1/58
[58] Field of Search ........................95/31, 34; 242/55.16, 74

[56] References Cited

UNITED STATES PATENTS

| | | | |
|---|---|---|---|
| 3,377,936 | 4/1968 | Goshima et al. | 95/31 |
| 3,387,546 | 6/1968 | Winkler et al. | 95/31 |
| 3,377,935 | 4/1968 | Furusawa | 95/31 |
| 3,276,341 | 10/1966 | Kremp et al. | 95/31 |

FOREIGN PATENTS OR APPLICATIONS 659,671   5/1965   Belgium ............................95/31 CA Primary Examiner—Samuel S. Matthews
Assistant Examiner—Russell E. Adams, Jr.
Attorney—Young and Thompson

[57] ABSTRACT

The photographic camera is provided with a chamber into which film passes from the supply spool after leaving the film gate. The chamber has two leaf springs arranged therein which act upon the edges of the film and guide the film into a roll form. In the center of the circle described by the leaf springs a catching device is provided which is formed by a spindle freely rotatably mounted on the camera and at least two arms bent into curved form and issuing from this spindle, the concave faces of which arms face in such a direction as to receive the film tongue entering the chamber. The width of the arms is equal to the distance between the two leaf springs and the arms protrude beyond the circle described by the leaf springs in the region between the two leaf springs at the beginning of the winding operation.

5 Claims, 4 Drawing Figures

Patented March 14, 1972  3,648,586

INVENTOR
HERBERT WELZEL
By Young & Thompson
ATTYS.

1

FILM WINDING APPARATUS FOR CAMERAS

BACKGROUND OF THE INVENTION

The invention relates to a photographic camera having a receiving chamber for the film entering from the supply spool by way of the film aperture, and two leaf springs bent into approximately circular form, arranged in the receiving chamber, acting only upon the edges of the film and serving to form a roll.

Due to such a formation the construction of the camera is substantially simplified, since on the one hand no takeup spool and on the other hand no gearing between film winding mechanism and takeup spool are necessary. Moreover with this principle the threading of the film into the slot of the takeup spool or a special automatic threading system is eliminated.

It has appeared that this principle is not usable for miniature films of normal length (36 frames), since in this case difficulties occurred in the formation of a film roll, which are caused on the one hand by the film tongue usual in readymade spools and cassettes for miniature film and on the other hand by the relatively great film length. In practice it has appeared that according to this principle only films of relatively short length (12 frames at format 24×36) and furthermore only those without a film tongue are usable.

Film cassettes arranged on the takeup side are also known which possess a nondriven spool core and a leaf spring enclosing this. However even these cassettes are usable only for films of relatively short length and those without a film tongue.

Finally a camera is known in which likewise the film enters a receiving chamber by way of the film aperture, the formation of the film roll being effected by a nondisplaceably and rotatably mounted roller and a pair of rollers displaceable against spring action. Such a style of arrangement is expensive.

The present invention is based upon the problem of providing a camera in which again it is possible to dispense with a driven film spool or a cassette with nondriven spool core, and with which films of ordinary length (36 frames at format 24×36 mm.) which are provided with a film threading piece can be handled.

According to one basic construction a receiving chamber is provided for the film entering from the supply spool by way of the film gate, and two leaf springs bent into approximately circular form, arranged in the receiving chamber, acting only upon the film edges and serving for the formation of a film roll are arranged.

SUMMARY OF INVENTION

According to the invention, in a photographic camera having a chamber for receiving film from a supply spool, two substantially circular leaf springs arranged in the chamber and spaced apart so as to act upon the edges of the film and a film gate through which the film is passed before entering said receiving chamber, the provision of a catching device freely rotatably mounted on a spindle in said chamber at the center of the circle described by the leaf springs, the catching device having at least two arms projecting from said spindle, said arms having concave faces facing in a direction such as to receive the leading edge of the film tongue entering said chamber, and being of a width equal to the distance between said spaced leaf springs and such length, in the radial direction, as to protrude beyond the circle described by the leaf springs before the winding of said film on the arms.

In further improvement of the object of the invention, segments are inserted between the arms for the lateral guidance of the film threading piece.

According to a further feature of the invention an especially deep catching opening for the film threading piece is achieved due to the fact that the arms are attached tangentially to the spindle carrying them.

Finally minimal expense for the catching device is achieved due to the fact that this device is formed from synthetic plastics material. In order to avoid interference with the catching device when the rear wall of the camera is opened, which can lead to damage to the device, in further development of the object of the invention a lid closing off the receiving chamber independently of the position of the hingeable rear wall is provided. This lid is expediently produced from transparent synthetic plastics material so that the receiving chamber can be inspected without removal of this lid.

BRIEF DESCRIPTION OF DRAWINGS

An example of embodiment of the invention is represented in the drawing, wherein.

DESCRIPTION OF PREFERRED EMBODIMENT

Figure 1:
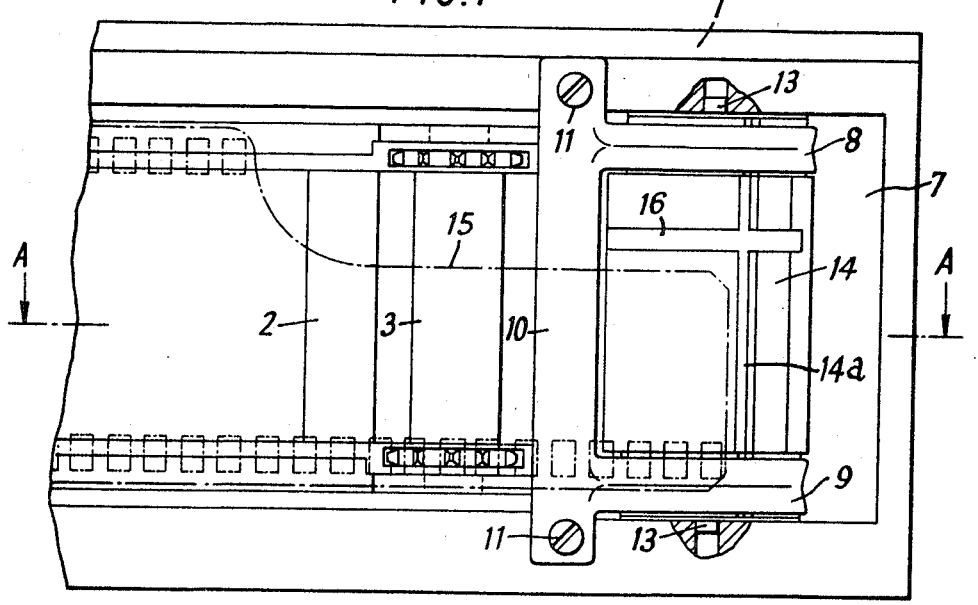
FIG. 1 shows a partial elevation of an opened camera comprising the catching device according to the invention.
Figure 2:
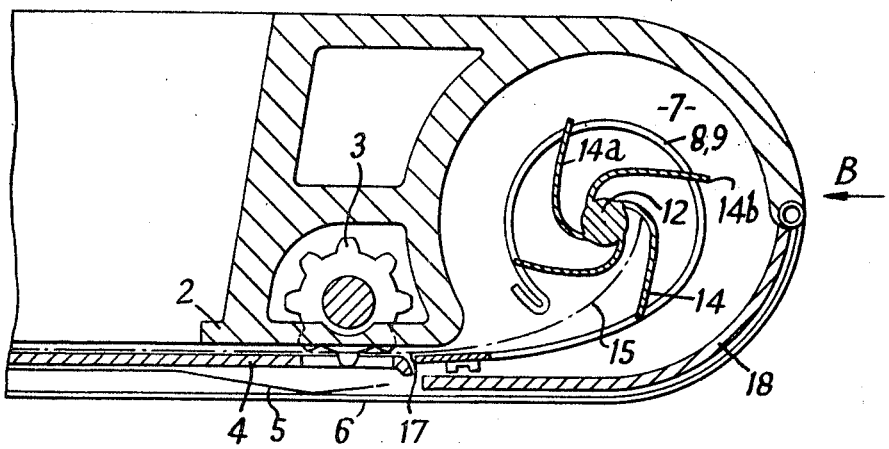
FIG. 2 shows a section in the direction A—A pressure FIG. 1 with the rear wall closed.
Figure 3:
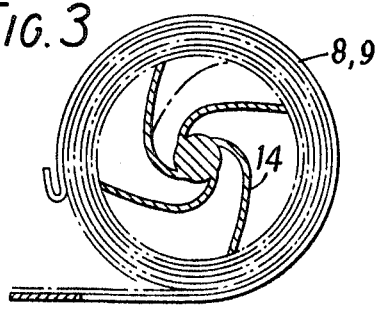
FIG. 3 shows the catching device with a wound-on film.
Figure 4:
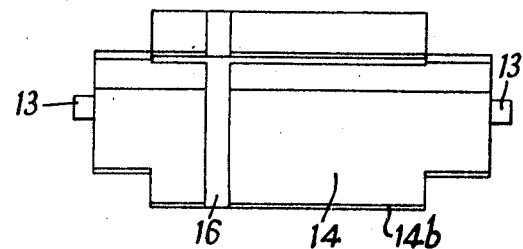
FIG. 4 shows a view of the catching device in the direction B in FIG. 2.

A film winder roller 3 is arranged in the manner known per se behind the picture aperture 2 in the camera housing 1, which is only partially illustrated. The film pressure plate 4 is connected through a leaf spring 5 with the rear wall 6 which is pivotally mounted on the camera housing 1. Correspondingly shaped parts of the camera housing 1 together with the rear wall 6 form a receiving chamber 7 for the exposed film. In this receiving chamber 7 are arranged two approximately circular leaf springs 8, 9, the beginning of which lies as an extension of the film pressure plate 4 and which are connected with one another by a transverse piece 10 and are secured by means of screws 11 to the camera housing 1. In the center of the circle described by the leaf springs 8, 9, a spindle 12 is arranged which is freely rotatably mounted with its journals 13 in the camera housing 1. Four arms 14 curved form are attached tangentially to the spindle 12, being uniformly distributed over its periphery.

The concave faces 14a of the arms 14 face in such a direction as to receive the film tongue 15 entering the receiving chamber 7. Segments 16 are provided between the arms 14 to ensure lateral guidance of the film threading piece 15. The edges 14b of the arms 14 protrude beyond the circle described by the leaf springs 8, 9, before the commencement of the winding operation, as the arms 14 are made somewhat higher in the region between the leaf springs 8, 9 than in the region of the leaf springs 8, 9. The entire catching device, consisting of the spindle 12, the arms 14 and the segments 16, is made as a plastics part. In order to avoid interference with the catching device with the rear wall 6 hinged open, the receiving chamber 7 is covered by a lid 18 consisting of a transparent synthetic plastics material. This lid is mounted in a manner not further illustrated and is removed or hinged away only when for example cleaning of the receiving chamber 7 is to be effected.

The manner of operation of the catching device described above is as follows:

With the rear wall 6 opened, the film tongue coming from the supply cassette (not shown) is drawn by hand over the film aperture 2 hooked with its perforation into the lower row of teeth of the film winder roll 3 and at the same time pushed with its leading edge into the slot 17 formed between the transverse piece 10 and the camera housing. Now the rear wall 6 is closed. On operation of the film winding handle known per se (not shown) the film tongue 15 is introduced by means of the film winder roll 3 into the receiving chamber 7. The leading edge of the film tongue then protrudes into one of the wedge-shaped catching chambers formed between the arms 14. On abutment of the leading edge of the film tongue on one of the concave surfaces 14a the catching device is rotated in the counterclockwise direction. Due to the fact that the edges 14b of the arms 14 protrude somewhat beyond the circle described by the leaf springs 8, 9 between these leaf springs, on introduction of the film tongue 15, the leading edge of the film threading piece 15 enters the catching chamber lying opposite to it and cannot be guided for example between the edges 14b and the leaf springs 8, 9 and then escape through the free space between the leaf springs into the receiving chamber 7. The segments 16 also prevent such escape of the film tongue 15, as they impart exact lateral guidance to it and thus prevent tilting which would favor escape.

In the course of the further operation of the film winding handle a firm film roll forms between the edges 14b of the arms 14 and the leaf springs 8, 9. After complete exposure of the film this is wound back into the supply cassette in known manner by means of a rewinding device.

I claim:

1. In a photographic camera having a chamber for receiving film from a supply spool, two substantially circular leaf springs arranged in the chamber and spaced apart so as to act upon the edges of the film and a film slot through which the film is passed before entering said receiving chamber, the provision of a catching device freely rotatably mounted on a spindle in said chamber at the center of the circle described by the leaf springs, the catching device having at least two arms projecting from said spindle, said arms having concave faces facing in a direction such as to receive the leading edge of the film tongue entering said chamber, and being of a width equal to the distance between said spaced leaf springs and being disposed between said leaf springs and protruding beyond the circle described by the leaf springs before the winding of said film on the arms whereby said leaf springs guide said leading edge onto a said concave face.

2. A photographic camera according to claim 1, wherein segments are provided between the arms for the lateral guidance of film threading means.

3. A photographic camera according to claim 1, wherein the arms are attached tangentially to the spindle.

4. A photographic camera according to claim 1, wherein the catching device is formed of plastics material.

5. A photographic camera according to claim 1, having a lid formed of transparent synthetic plastics material for closing off the receiving chamber independently of the position of the camera rear wall.

* * * * *